US010355761B2

(12) United States Patent
Chen

(10) Patent No.: US 10,355,761 B2
(45) Date of Patent: Jul. 16, 2019

(54) BEAM ADMINISTRATION METHODS FOR CELLULAR/WIRELESS NETWORKS

(71) Applicant: MEDIATEK INC., Hsinchu (TW)

(72) Inventor: Ju-Ya Chen, Kaohsiung (TW)

(73) Assignee: MEDIATEK INC., HsinChu (TW)

( * ) Notice: Subject to any disclaimer, the term of this patent is extended or adjusted under 35 U.S.C. 154(b) by 43 days.

(21) Appl. No.: 14/868,705

(22) Filed: Sep. 29, 2015

(65) Prior Publication Data

US 2016/0099763 A1 Apr. 7, 2016

Related U.S. Application Data

(60) Provisional application No. 62/060,786, filed on Oct. 7, 2014.

(51) Int. Cl.
*H04B 7/06* (2006.01)
*H04W 56/00* (2009.01)

(52) U.S. Cl.
CPC .......... *H04B 7/0617* (2013.01); *H04B 7/063* (2013.01); *H04B 7/0695* (2013.01); *H04W 56/0045* (2013.01); *H04B 7/0628* (2013.01)

(58) Field of Classification Search
CPC ................................... H04B 7/0617
USPC .......................................... 370/329
See application file for complete search history.

(56) References Cited

U.S. PATENT DOCUMENTS 8,983,547 B2 * 3/2015 Jeong ................. H04B 7/0617
455/275
9,521,560 B2 * 12/2016 Sundaresan ............. H01Q 3/00
2004/0235527 A1 11/2004 Reudink et al. ............. 455/561
2005/0136980 A1 * 6/2005 Kim ..................... H01Q 1/246
455/562.1
2008/0291851 A1 * 11/2008 Guthy .................. H04B 7/0452
370/280
2013/0072244 A1 3/2013 Jeong et al. .................. 455/509
(Continued)

FOREIGN PATENT DOCUMENTS

CN 101137185 A 1/2007
CN 102271014 A 6/2011
(Continued)

OTHER PUBLICATIONS

International Search Report and Written Opinion of International Search Authority for PCT/CN2015/091474 dated Jan. 18, 2016 (11 pages).

(Continued)

*Primary Examiner* — Peter G Solinsky
(74) *Attorney, Agent, or Firm* — Imperium Patent Works; Zheng Jin; Helen Mao

(57) ABSTRACT

A method of beam administration in a cellular or wireless network is proposed. Cellular/wireless networks operating at Ka or higher frequency band require the use of directional antenna (or through array-based beamforming) to compensate for sever pathloss. Maintaining antenna pointing and tracking accuracy is essential in many phases of the communication process. By using uplink pilot signals for beam alignment/tracking, combined with switched beamforming at the UE and adaptive beamforming at the BS, an effective beam administration is achieved with reduced overhead, complexity, and cost.

23 Claims, 6 Drawing Sheets

(56) References Cited

U.S. PATENT DOCUMENTS

| | | | |
|---|---|---|---|
| 2013/0301454 A1* | 11/2013 | Seol | H04B 7/043 370/252 |
| 2013/0301619 A1 | 11/2013 | Singh et al. | 370/336 |
| 2014/0051351 A1 | 2/2014 | Jia | 455/39 |
| 2014/0206367 A1* | 7/2014 | Agee | H04W 28/0236 455/450 |
| 2015/0009984 A1* | 1/2015 | Jung | H04W 56/0055 370/350 |
| 2015/0103934 A1* | 4/2015 | Nam | H04B 7/0413 375/260 |
| 2015/0282122 A1* | 10/2015 | Kim | H04L 25/03898 370/329 |
| 2016/0043781 A1* | 2/2016 | Cho | H04L 5/0051 342/373 |
| 2016/0142922 A1* | 5/2016 | Chen | H04B 7/0695 375/267 |
| 2016/0352403 A1* | 12/2016 | Kishiyama | H04B 7/0695 |
| 2017/0033854 A1* | 2/2017 | Yoo | H04W 24/00 |

FOREIGN PATENT DOCUMENTS

| | | |
|---|---|---|
| WO | WO2013022161 A1 | 8/2011 |
| WO | WO2013039355 A2 | 9/2011 |

OTHER PUBLICATIONS

EPO, search report for the EP patent application 15849639.8 dated Mar. 13, 2018 (7 pages).

\* cited by examiner

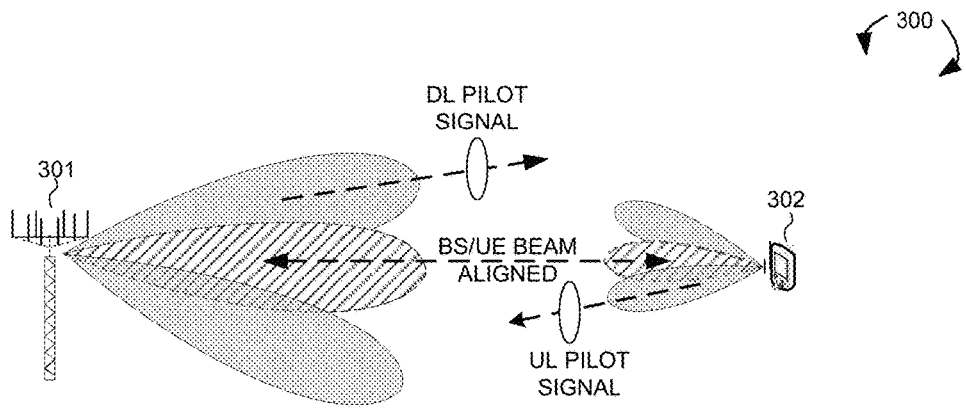

FIG. 3

|  | Switched beamforming (UE) | Adaptive beamforming (UE) |
|---|---|---|
| Switched beamforming (BS) | - UE complexity is acceptable<br>- BS complexity is low<br>- Beam patterns for both UE and BS are not flexible<br>- Beam alignment time is long (assume BS ant. no. is large)<br>- UL/DL pilot signal can be used for beam alignment<br><u>OPTION 1</u> | - UE complexity is too high<br>- BS complexity is low<br>- Beam patterns for UE are more flexible<br>- Beam alignment time is long (assume BS ant. no. is large)<br>- DL pilot signal is used for beam alignment<br><u>OPTION 2</u> |
| Adaptive beamforming (BS) | - UE complexity is acceptable<br>- BS complexity is acceptable<br>- Beam patterns for BS are more felxible<br>- Beam alignment time is acceptable<br>- UL pilot signal is used for beam alignment<br><u>OPTION 3</u> | - UE complexity is too high<br>- BS complexity is acceptable<br>- Beam patterns for both UE and BS are more flexible<br>- Beam alignment time is acceptable<br>- UL/DL pilot signal can be used for beam alignment<br><u>OPTION 4</u> |

FIG. 4

BEAM ADMINISTRATION METHODS FOR CELLULAR/WIRELESS NETWORKS

CROSS REFERENCE TO RELATED APPLICATIONS

This application claims priority under 35 U.S.C. § 119 from U.S. Provisional Application No. 62/060,786, entitled "Beam Administration Methods for Cellular/Wireless Networks," filed on Oct. 7, 2014; the subject matter of which is incorporated herein by reference.

TECHNICAL FIELD

The disclosed embodiments relate generally to wireless communication, and, more particularly, to beam administration methods in a Millimeter Wave (mmW) beamforming system.

BACKGROUND

The bandwidth shortage increasingly experienced by mobile carriers has motivated the exploration of the underutilized Millimeter Wave (mmWave) frequency spectrum between 3G and 300G Hz for the next generation broadband cellular communication networks. The available spectrum of mmWave band is two hundred times greater than the conventional cellular system. The mmWave wireless network uses directional communications with narrow beams and can support multi-gigabit data rate. The underutilized bandwidth of the mmWave spectrum has wavelengths ranging from 1 mm to 100 mm. The very small wavelengths of the mmWave spectrum enable large number of miniaturized antennas to be placed in a small area. Such miniaturized antenna system can produce high beamforming gains through electrically steerable arrays generating directional transmissions.

With recent advances in mmWave semiconductor circuitry, mmWave wireless system has become a promising solution for real implementation. However, the heavy reliance on directional transmissions and the vulnerability of the propagation environment present particular challenges for the mmWave network. In general, a cellular network system is designed to achieve the following goals: 1) Serve many users with widely dynamical operation conditions simultaneously; 2) Robust to the dynamics in channel variation, traffic loading and different QoS requirement; and 3) Efficient utilization of resources such as bandwidth and power. Beamforming adds to the difficulty in achieving these goals.

Maintaining antenna pointing and tracking accuracy is essential in many phases of the communication process. In principle, beam administration/training mechanism, which includes both initial beam alignment and subsequent beam tracking, ensures that base station (BS) beam and user equipment (UE) beam are aligned for data communication. Hierarchical level beam pattern is assumed in wireless or cellular networks. Different beamformers can have different spatial resolution. For example, a sector antenna can have shorter by wider spatial coverage, while a beamforming antenna can have longer by narrower spatial coverage. To provide moderate array gain, large number of array elements may be needed.

There are two types of beamforming: switched beamforming and adaptive beamforming. Adaptive beamforming means digital beamforming. The complexity of adaptive beamforming is high with flexible beam patterns, while beam alignment time is acceptable. Switched beamforming is analog or hybrid beamforming. The complexity of switched beam forming is low, while beam patterns are not flexible and beam alignment time is long. Beam administration methods are sought to perform beam alignment and beam tracking for both BS and UE.

SUMMARY

A method of beam administration in a cellular or wireless network is proposed. Cellular/wireless networks operating at Ka or higher frequency band require the use of directional antenna (or through array-based beamforming) to compensate for sever pathloss. Maintaining antenna pointing and tracking accuracy is essential in many phases of the communication process. By using uplink pilot signals for beam alignment/tracking, combined with switched beamforming at the UE and adaptive beamforming at the BS, an effective beam administration is achieved with reduced overhead, complexity, and cost.

In one embodiment, a base station provides beam training information to a UE in a wireless communication network. The beam training information comprises a training period, a window size, and resource mapping information. The base station receives an uplink pilot signal transmitted from the UE over one or more UE beams. The base station performs adaptive beamforming using a plurality of BS beams for each UE beam. Finally, the base station transmits a beam training complete command to the UE. The beam training complete command comprises a selected UE beam ID, a selected BS beam ID, and a timing advance value associated with the selected UE beam for uplink transmission.

In another embodiment, a user equipment (UE) obtains beam training information in a wireless communication network. The beam training information comprises a training period, a window size, and resource mapping information. The UE transmits an uplink pilot signal over one or more UE beams based on the received beam training information. The UE receives a beam training complete command from the BS. The beam training complete command comprises a selected UE beam ID, a selected BS beam ID, and a timing advance value associated with the selected UE beam for uplink transmission.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 3 illustrates beam administration for beam alignment and beam tracking.

FIG. 4 illustrates different options of beamforming for beam administration.

DETAILED DESCRIPTION

Reference will now be made in detail to some embodiments of the invention, examples of which are illustrated in the accompanying drawings.

Figure 1:
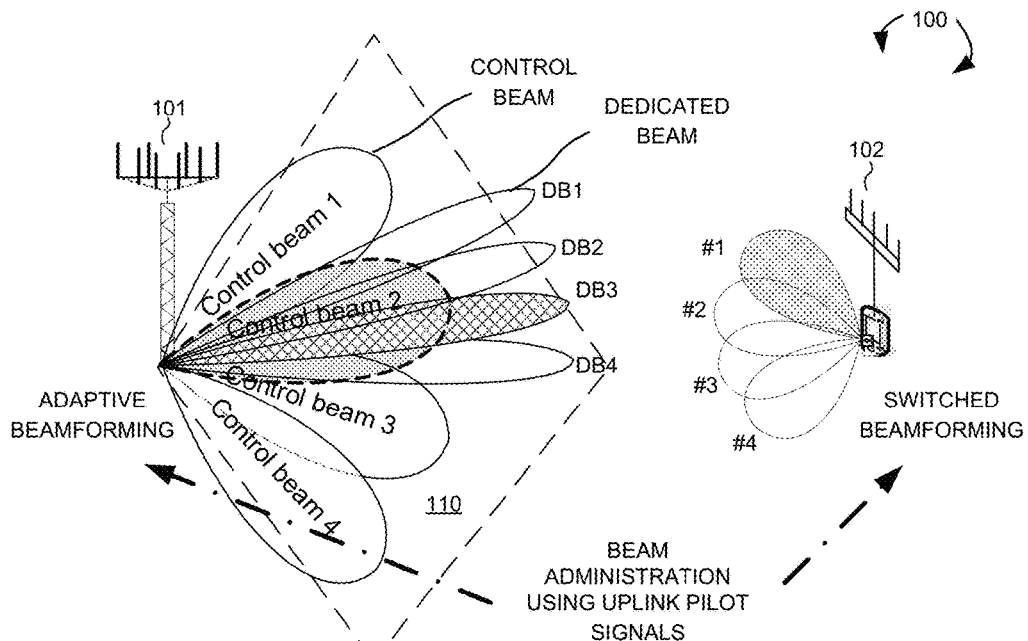
FIG. 1 illustrates control beams and dedicated beams and beam administration between BS and UE in a beamforming wireless communication system in accordance with one novel aspect.

FIG. 1 illustrates control beams and dedicated beams and beam administration between a base station and a user equipment in a beamforming Millimeter Wave (mmWave) cellular network 100 in accordance with one novel aspect. Beamforming mmWave mobile communication network 100 comprises a base station BS 101 and a user equipment UE 102. The mmWave cellular network uses directional communications with narrow beams and can support multi-gigabit data rate. Directional communications are achieved via digital (adaptive) and/or analog (switched) beamforming, wherein multiple antenna elements are applied with multiple sets of beamforming weights to form multiple beams. In the example of FIG. 1, BS 101 is directionally configured with multiple cells, and each cell is covered by a set of coarse TX/RX control beams. For example, cell 110 is covered by a set of four control beams CB1, CB2, cB3, and CB4. The collection of the control beams CB1-CB4 covers an entire service area of cell 110, and each control beam has a wider and shorter spatial coverage with smaller array gain. Each control beam in turn is covered by a set of dedicated data beams. For example, CB2 is covered by a set of four dedicated data beams DB1, DB2, DB3, and DB4. The collection of the dedicated data beams covers a service area of one control beam, and each dedicated data beam has a narrower and longer spatial coverage with larger array gain. Similarly, UE 102 may also apply beamforming to from multiple beams.

Hierarchical level beam patterns is assumed in wireless or cellular networks. Level 0 beam pattern is omni-directional and used for macro cell stations. The set of control beams are lower-level (Level 1) beams that provide low rate control signaling to facilitate high rate data communication on higher-level (Level 2) dedicated data beams. The set of control beams may be periodically configured or occur indefinitely and repeatedly in order known to the UEs. The set of control beams covers the entire cell coverage area with moderate beamforming gain. Each control beam broadcasts minimum amount of cell-specific and beam-specific information similar to System Information Block (SIB) or Master Information Block (MIB) in LTE systems. The control beam and dedicated data beam architecture provides a robust control-signaling scheme to facilitate the beamforming operation in mmWave cellular network systems.

Maintaining antenna pointing and tracking accuracy is essential in many phases of the communication process. In principle, beam administration mechanism, which includes both initial beam alignment and subsequent beam tracking, ensures that BS beam and UE beam are aligned for data communication. For example, BS DB#3 is aligned with UE beam #1 in FIG. 1. There are two types of beamforming: switched beamforming and adaptive beamforming. Adaptive beamforming means digital beamforming. The complexity of adaptive beamforming is high with flexible beam patterns, while beam alignment time is acceptable. Switched beamforming is analog or hybrid beamforming. The complexity of switched beam forming is low, while beam patterns are not flexible and beam alignment time is long. In general, the complexity of BS can be much higher than that of UE, especially in antenna design and baseband signaling processing.

In according with one novel aspect, UE 102 can use switched beamforming to reduce complexity and cost, while BS 101 can use adaptive or digital beamforming to obtain more degree of freedom in antenna beam patterns. In general, the number of RF chains at BS side can be larger than that at UE side. As a result, the number of uplink pilot signals is less than that of downlink pilot signal with the same beam training performance. This is because several receiving beam patterns can be formed by adaptive beamforming, which can estimate different angle of arrive simultaneously at BS side. Therefore, by using uplink pilot signals for beam training, combined with switched beamforming at the UE and adaptive beamforming at the BS, an effective beam administration is achieved with reduced overhead, complexity, and cost.

Figure 2:
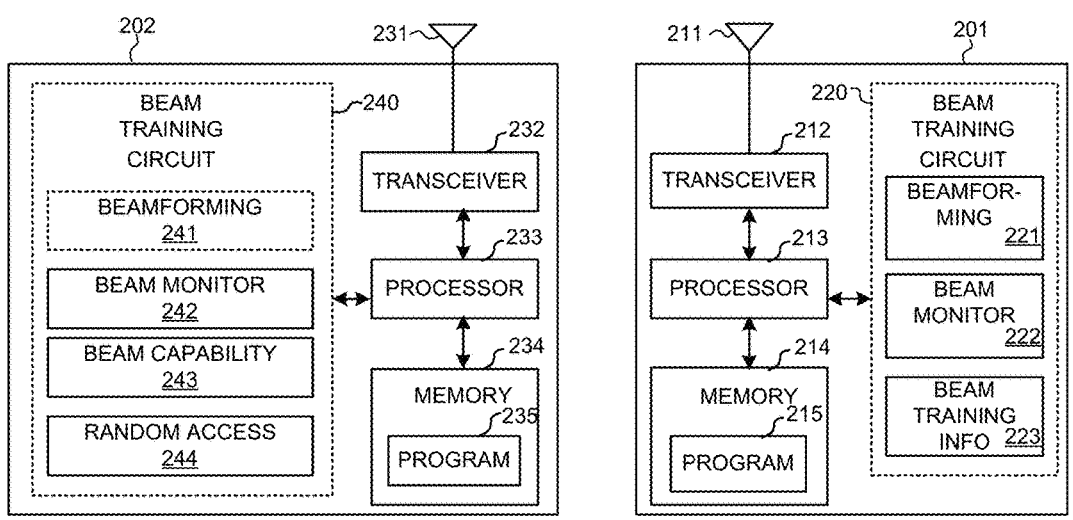
FIG. 2 is a simplified block diagram of a base station and a user equipment that carry out certain embodiments of the present invention.

FIG. 2 is a simplified block diagram of a base station and a user equipment that carry out certain embodiments of the present invention. BS 201 has an antenna array 211 having multiple antenna elements that transmits and receives radio signals, one or more RF transceiver modules 212, coupled with the antenna array, receives RF signals from antenna 211, converts them to baseband signal, and sends them to processor 213. RF transceiver 212 also converts received baseband signals from processor 213, converts them to RF signals, and sends out to antenna 211. Processor 213 processes the received baseband signals and invokes different functional modules to perform features in BS 201. Memory 214 stores program instructions and data 215 to control the operations of BS 201. BS 201 also includes multiple function modules that carry out different tasks in accordance with embodiments of the current invention.

Similarly, UE 202 has an antenna 231, which transmits and receives radio signals. A RF transceiver module 232, coupled with the antenna, receives RF signals from antenna 231, converts them to baseband signals and sends them to processor 233. RF transceiver 232 also converts received baseband signals from processor 233, converts them to RF signals, and sends out to antenna 231. Processor 233 processes the received baseband signals and invokes different functional modules to perform features in UE 202. Memory 234 stores program instructions and data 235 to control the operations of UE 202. UE 202 also includes multiple function modules and circuits that carry out different tasks in accordance with embodiments of the current invention.

The functional modules are circuits that can be implemented and configured by hardware, firmware, software, and any combination thereof. For example, BS 201 comprises a beam training circuit 220, which further comprises a beamforming circuit 221, a beam monitor 222, and a beam training information circuit 223. Beamforming circuit 221 may belong to part of the RF chain, which applies various beamforming weights to multiple antenna elements of antenna 211 and thereby forming various beams. Beam monitor 222 monitors received radio signals and performs measurements of the radio signals over the various beams.

Beam training information circuit 223 provides beam training information including training period, window size, and resource mapping information to UE.

Similarly, UE 202 comprises a beam training circuit 240, which further comprises a beamforming circuit 241, a beam monitor 242, a beam capability circuit 243, and a random access circuit 244. Beamforming circuit 241 may belong to part of the RF chain, which applies various beamforming weights to multiple antenna elements of antenna 231 and thereby forming various beams. Beamforming circuit 241 is optional for UE side, because UE 202 can use omni beam instead. Beam monitor 242 monitors received radio signals and performs measurements of the radio signals over the various beams. Beam capability circuit 243 provides UE beamforming/antenna capability information and preferred beam patterns/codebook for beam training. Random access circuit 244 performs contention-based and non-contention-based random access procedure with BS, which can be combined with the beam training procedure for beam alignment and beam tracking.

FIG. 3 illustrates beam administration for beam alignment and beam tracking in a beamforming network 300. Beam training includes initial beam alignment and subsequent beam tracking, which ensures that BS 301 and UE 302 are aligned for data transmission. For the downlink direction, BS 301 transmits downlink pilot signals so that UE 302 can train the UE receiving beams. For the uplink direction, UE 302 transmits uplink pilot signals so that BS 301 can train the BS receiving beams. Based on phased array reciprocity or channel reciprocity, the same receiving antenna pattern can be used for transmitting antenna pattern. Different algorithms can be applied in choosing the best receiving beam, including (but not limited to) power maximization, SINR maximization, or interference minimization.

FIG. 4 illustrates different options of beamforming for beam administration. In a first option, both BS and UE perform switched beamforming. Under this option, beam alignment time is long (assume BS antenna number is large). In a second option, BS performs switched beamforming, while UE performs adaptive beamforming. Under this option, UE complexity is too high, and beam alignment time is long (assume BS antenna number is large). In a third option, BS performs adaptive beamforming, while UE performs switched beamforming. In a fourth option, both BS and UE perform adaptive beamforming. Under this option, UE complexity is too high.

The complexity of BS can be much higher than that of UE, especially in antenna design and baseband signal processing. In other words, the number of RF chains at BS side can be larger than that at UE side. This implies the number of uplink pilot signal is less than that of downlink pilot signal with the same performance. By using adaptive beamforming, the BS can estimate different angle of arrival of uplink pilot signal simultaneously because several receiving beam patterns can be formed by adaptive beamforming. Therefore, among the different options, the third option is preferred. UE can use switched beamforming to reduce complexity and cost. BS can use adaptive or digital beamforming to obtain more degree of freedom in antenna beam patterns. Under this option, both UE and BS complexity is acceptable. Beam patterns for BS are more flexible. Beam alignment time is acceptable. UL pilot signal is used for beam administration, including beam alignment and beam tracking.

Figure 5:
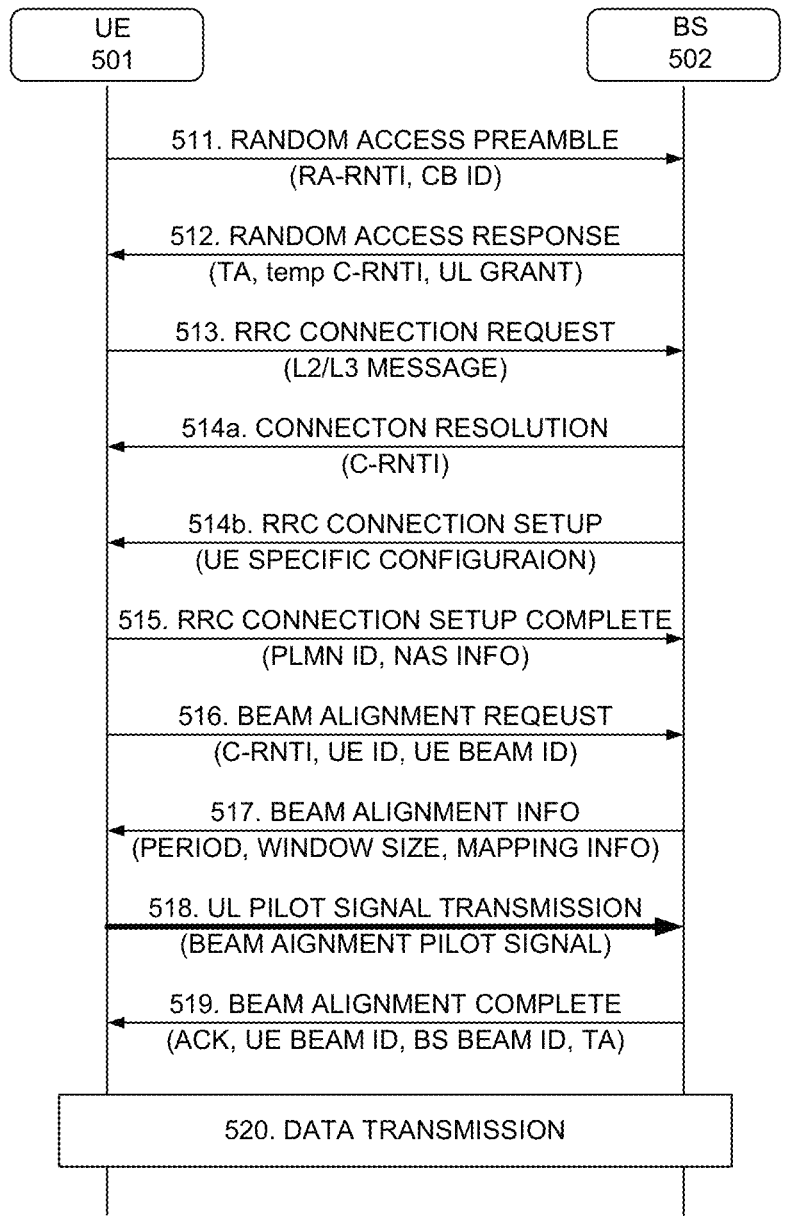
FIG. 5 illustrates one embodiment of random access procedure followed by beam alignment.

FIG. 5 illustrates one embodiment of random access procedure followed by a UE-initiated beam alignment procedure. In step 511, UE 501 transmits a random access preamble with RA-RNTI and control beam ID. In step 512, UE 501 receives a random access response from BS 502 with timing advance (TA), temporary C-RNTI, and UL grant. In step 513, UE 501 transmits an RRC connection request with L2/L3 message. In step 514a, UE 501 receives connection resolution with C-RNTI. In step 514b, BS 502 sends an RRC connection setup with UE specific configuration. In step 515, UE 501 sends an RRC connection setup complete with PLMN ID and dedicated NAS info. The random access and RRC connection setup procedure are completed.

In step 516, UE 501 sends a beam alignment request with C-RNTI, UE ID, and UE beam ID (e.g., the number of UE beams to be trained if multiple UE beams). This can be sent before or after RRC connection completed. Note that before second the beam alignment request, UE 501 can align the receiving beam by using cell search or control signals first. Based on phased array reciprocity or channel reciprocity, UE 501 uses the same receiving antenna pattern as transmitting antenna pattern. In step 517, UE 501 receives beam alignment information command from BS 502. The beam alignment information command contains beam alignment period (how often), window size (how long), and resource mapping information. In step 518, UE 501 continuously sends uplink pilot signals based on the beam alignment information command over each to-be-trained UE beam using switched beamforming.

BS 502 uses the received pilot signal to choose the best receiving beam based on power maximization, SINR maximization, or interference minimization with angle of arrival (AoA) algorithm. In AoA, the receiver employs multiple antennas to receive signal and resolves angle of arrival relative to its own antenna platform orientation. Note that the beam alignment procedure is not limited to exhaustive or hierarchical search for different level of beams. BS 502 can simultaneously receive uplink pilot signal by different antenna or beam patterns based on BS RF and baseband processing capability. In step 519, after BS 502 has decided the best receiving beam, BS 502 sends a beam alignment complete message to UE 501 with an acknowledgement, a selected UE beam ID (if multiple UE beams are trained), BS beam ID (optional), and TA information. Note that it is optional to inform the BS beam ID to the UE because it is BS side decision only. In step 520, UE 501 and BS 502 perform data transmission accordingly. UE 501 can adjust its timing advance for uplink synchronization based on the receiving TA value in step 519.

The beam alignment request and beam alignment information command can be omitted in some cases. Either contention-based or non-contention-based random access procedure can be used and combined with beam administration procedure. During the random access procedure, the random access preamble is used as the uplink pilot signal for beam alignment, and the random access response (RAR) message is used as the beam alignment complete command.

Figure 6:
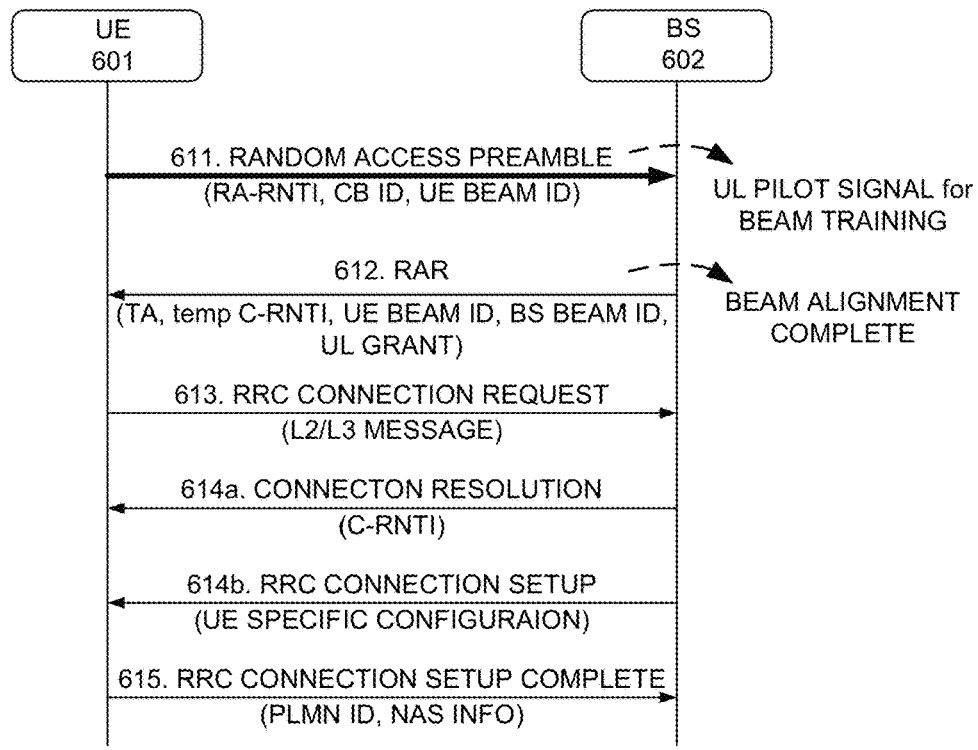
FIG. 6 illustrates one embodiment of contention based joint random access and beam administration process in a beamforming system.

FIG. 6 illustrates one embodiment of contention based joint random access and beam administration process in a beamforming system. In step 611, UE 601 transmits a random access preamble with RA-RNTI, control beam ID, and UE beam ID. The random access preamble is equivalent to the uplink pilot signal for beam training. UE 601 randomly selects a random access preamble and RACH resource for the transmission. In step 612, UE 601 receives a random access response (RAR) from BS 602 with timing advance (TA), temporary C-RNTI, UE beam ID, BS beam ID (optional), and UL grant. The RAR is equivalent to the beam alignment complete command. In step 613, UE 601 transmits an RRC connection request with L2/L3 message. In step 614*a*, UE 601 receives connection resolution with C-RNTI. In step 614*b*, BS 602 sends an RRC connection setup with UE specific configuration. In step 615, UE 601 sends an RRC connection setup complete with PLMN ID and dedicated NAS info. The random access and RRC connection setup procedure are completed.

Figure 7:
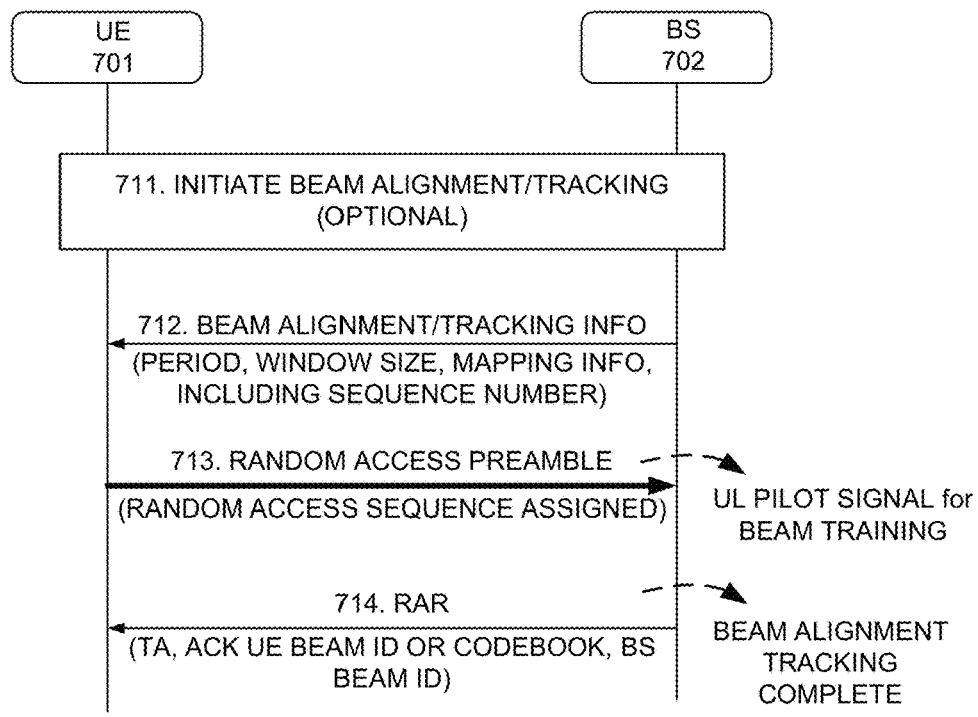
FIG. 7 illustrates one embodiment of non-contention based joint random access and beam administration process in a beamforming system.

FIG. 7 illustrates one embodiment of non-contention based joint random access and beam administration process in a beamforming system. In step 711, UE 701 and BS 702 perform initial beam alignment and beam tracking (optional). This could be either UE-initiated or BS-initiated. If beam tracking is regarded as a regular process, then the rule for this process is transmitted in system information. In step 712, BS 702 sends a beam alignment/tracking information command. The command includes training period, window size, resource mapping information, including random access sequence number. In step 713, UE 701 transmits random access preamble based on received beam alignment/tracking information. The random access preamble is equivalent to the uplink pilot signal for beam alignment/tracking. In addition, the random access preamble and RACH resource is already assigned by BS 702 via the resource mapping information. In step 714, BS 702 sends a random access response (RAR) to UE 701, which includes TA, ACK the selected UE beam or codebook, and BS beam ID (optional). The RAR is equivalent to the beam alignment/tracking complete command.

Figure 8:
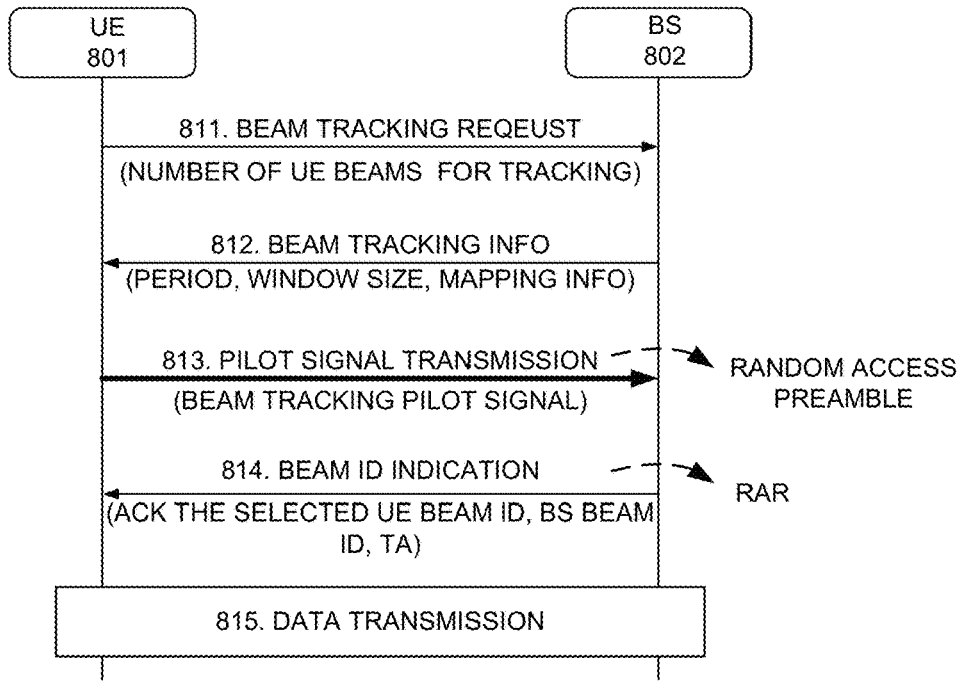
FIG. 8 illustrates a UE-initiated beam tracking procedure in a beamforming system.

FIG. 8 illustrates a UE-initiated beam tracking procedure in a beamforming system. Beam tracking procedure only operates under beam-aligned condition. In step 811, UE 801 sends a beam-tracking request to initialize beam-tracking procedure. UE 801 reports the beamforming and antenna capability and preferred beam patterns or codebook for tracking. This step can be omitted or combined with other control signaling (such as UE capability reporting). In step 812, BS 802 sends beam-tracking information to UE 801. The information can be sent in cell/beam-specific system information and then this step can be omitted. The information can also be sent in UE-specific. Beam tracking period, window size, and resource mapping information are carried in the beam tracking information command. In step 813, UE 801 continuously sends uplink pilot signal based on beam tracking information over each UE beam. BS 802 uses received pilot signals to choose the best receiving beam based on power maximization, SINR maximization, or interference minimization with angle of arrival estimation algorithm. Note that the beam tracking procedure is not limited to exhaustive or hierarchical search for different level of beams. BS 802 can simultaneously receive uplink pilot signal by different antenna or beam patterns based on BS RF and baseband processing capability. In step 814, after BS 802 has decided the best receiving beam, BS 802 sends a beam ID indication command to UE 801 with an acknowledgement of the selected UE beam ID or codebook, BS beam ID (optional), and TA information. In step 815, UE 801 performs data transmission and adjusts the transmitting beam pattern after receiving the beam ID indication. If beam ID indication is not received, UE 801 uses the current beam pattern for data transmission. UE 801 can adjust its timing advance for uplink synchronization based on the receiving TA value in step 814.

Figure 9:
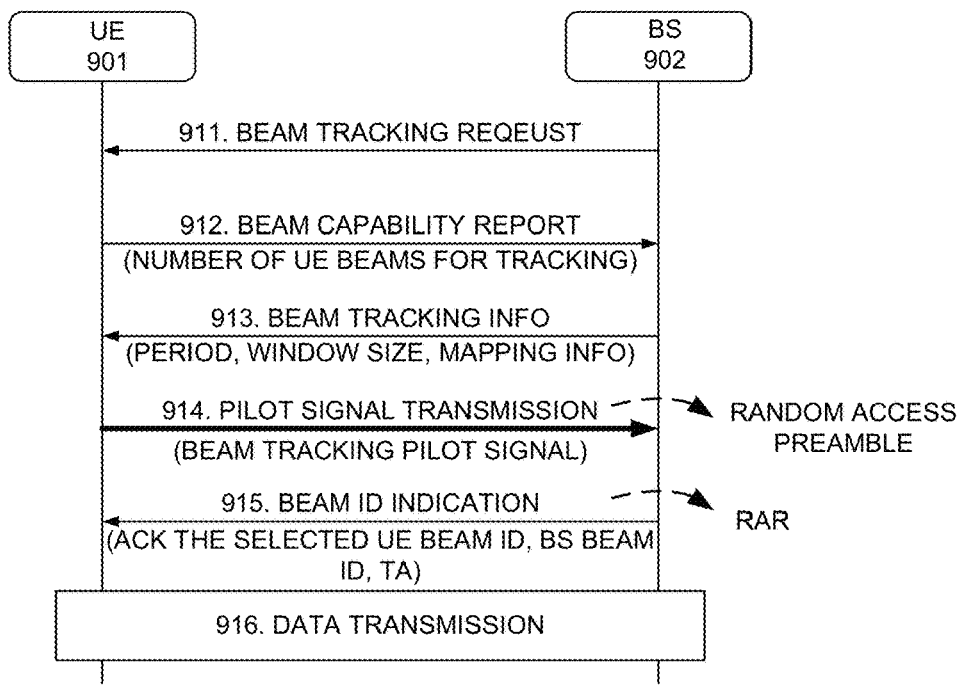
FIG. 9 illustrates a BS-initiated beam tracking procedure in a beamforming system.

FIG. 9 illustrates a BS-initiated beam tracking procedure in a beamforming system. Beam tracking procedure only operates under beam-aligned condition. In step 911, BS 902 uses beam-tracking request to initialize the beam tracking procedure. This step can be omitted or combined with other control signaling. In step 912, UE 901 reports the beamforming and antenna capability and preferred beam patterns or codebook for tracking. This step can be omitted or combined with other control signaling (such as UE capability reporting). In step 913, BS 902 sends beam-tracking information to UE 901. The information can be sent in cell/beam-specific system information and then this step can be omitted. The information can also be sent in UE-specific. Beam tracking period, window size, and resource mapping information are carried in the beam tracking information command. In step 914, UE 901 continuously sends uplink pilot signal based on beam tracking information over each UE beam. BS 902 uses received pilot signals to choose the best receiving beam based on power maximization, SINR maximization, or interference minimization with angle of arrival estimation algorithm. Note that the beam tracking procedure is not limited to exhaustive or hierarchical search for different level of beams. BS 902 can simultaneously receive uplink pilot signal by different antenna or beam patterns based on BS RF and baseband processing capability. In step 915, after BS 902 has decided the best receiving beam, BS 902 sends a beam ID indication command to UE 901 with an acknowledgement of the selected UE beam ID or codebook, BS beam ID (optional), and TA information. In step 916, UE 901 performs data transmission and adjusts the transmitting beam pattern after receiving the beam ID indication. If beam ID indication is not received, UE 901 uses the current beam pattern for data transmission. UE 901 can adjust its timing advance for uplink synchronization based on the receiving TA value in step 915.

Figure 10:
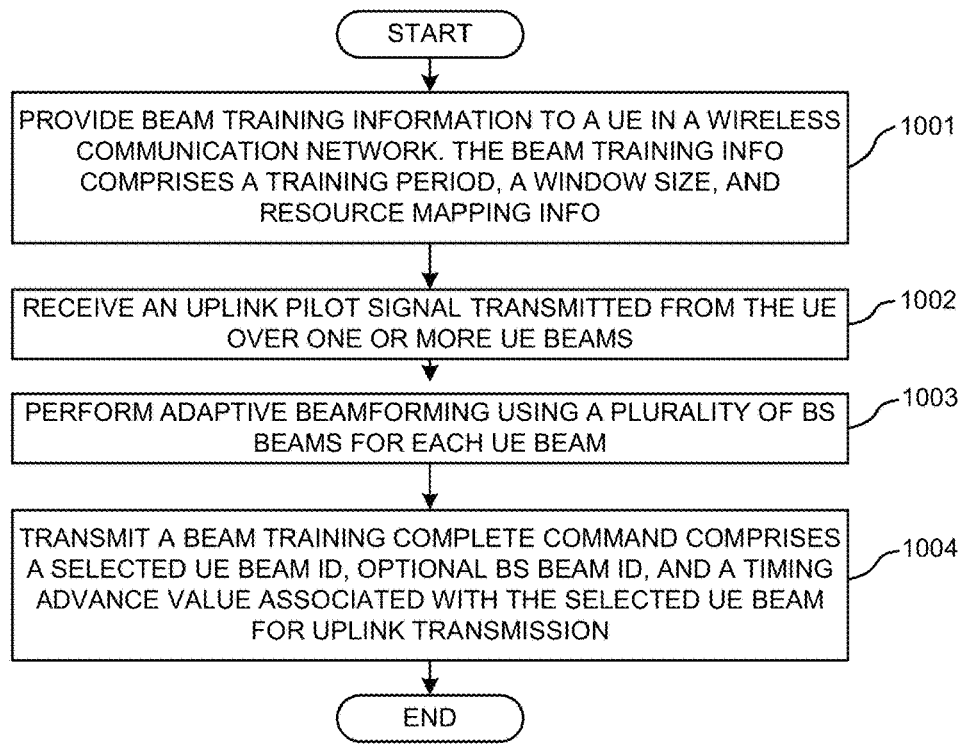
FIG. 10 is a flow chart of a method of beam administration from UE perspective in a beamforming system in accordance with one novel aspect.

FIG. 10 is a flow chart of a method of beam administration from UE perspective in a beamforming system in accordance with one novel aspect. In step 1001, a base station provides beam training information to a UE in a wireless communication network. The beam training information comprises a training period, a window size, and resource mapping information. In step 1002, the base station receives an uplink pilot signal transmitted from the UE over one or more UE beams. In step 1003, the base station performs adaptive beamforming using a plurality of BS beams for each UE beam. In step 1004, the base station transmits a beam training complete command to the UE. The beam training complete command comprises a selected UE beam ID, a selected BS beam ID (optional), and a timing advance value associated with the selected UE beam for uplink transmission.

Figure 11:
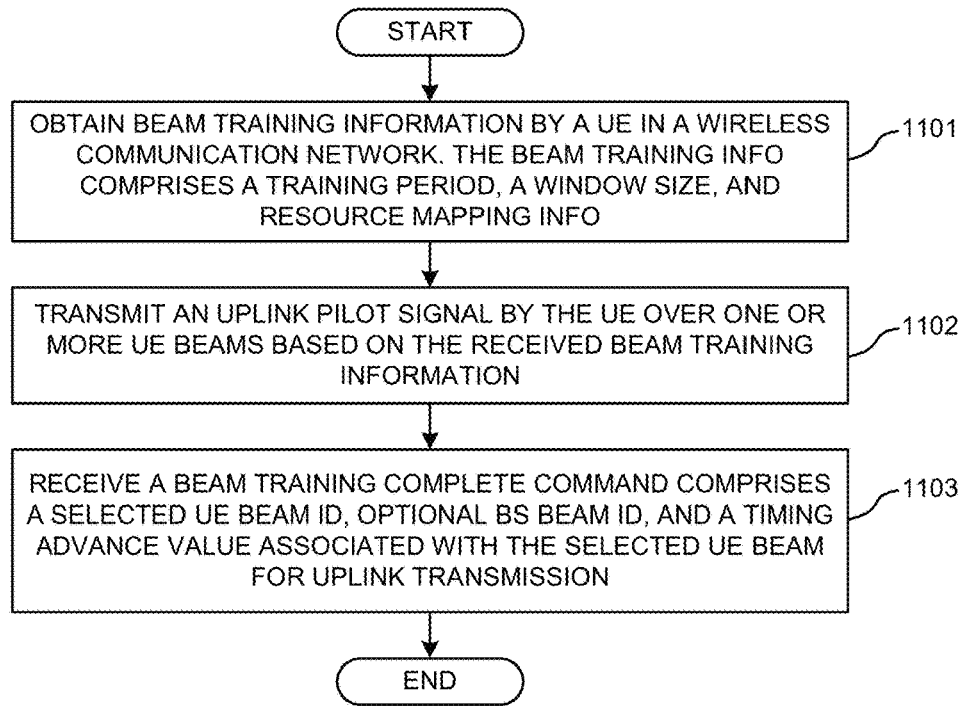
FIG. 11 is a flow chart of a method of beam administration from BS perspective in a beamforming system in accordance with one novel aspect.

FIG. 11 is a flow chart of a method of beam administration from BS perspective in a beamforming system in accordance with one novel aspect. In step 1101, a user equipment (UE) obtains beam training information in a wireless communication network. The beam training information comprises a training period, a window size, and resource mapping information. In step 1102, the UE transmits an uplink pilot signal over one or more UE beams based on the received beam training information. In step 1103, the UE receives a beam training complete command from the BS. The beam training complete command comprises a selected UE beam ID, a selected BS beam ID (optional), and a timing advance value associated with the selected UE beam for uplink transmission.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   generating and providing beam training information by a base station (BS) to a user equipment (UE) in a wireless communication network, wherein the beam training information comprises a training period, a window size, and resource mapping information;
   receiving an uplink pilot signal transmitted from the UE over one or more UE beams, wherein a subset of uplink beam patterns is received;
   performing adaptive beamforming using a plurality of BS beams for each UE beam, wherein the uplink has less pilot signals than the downlink pilot signals and the adaptive beamforming estimates one or more receiving beam patterns; and
   transmitting a beam training complete command by the base station, wherein the beam training complete command comprises a selected UE beam ID and a timing advance value associated with the selected UE beam for uplink transmission.

2. The method of claim 1, wherein the beam training information is provided via cell/beam-specific system information.

3. The method of claim 1, wherein the beam training involves either an initial beam alignment procedure or a subsequent beam tracking procedure.

4. The method of claim 3, wherein the base station initiates the beam tracking procedure by sending a beam-tracking request and in response receives a beam capability report comprising a number of UE beam patterns for tracking.

5. The method of claim 1, wherein the adaptive beamforming involves selecting a best BS beam based on one of a maximum signal power, a maximum signal to noise ration or signal to interference plus noise ratio (SNR/SINR), a minimum interference, and an angle of arrival estimation.

6. The method of claim 1, wherein the uplink pilot signal is received as a random access preamble transmitted over a random access channel (RACH) during a RACH procedure.

7. The method of claim 6, wherein the RACH procedure is contention-based for initial beam alignment.

8. The method of claim 5, wherein the RACH procedure is non-contention-based for subsequent beam tracking, and wherein the BS assigns the random access preamble and allocates a RACH resource via the resource mapping information.

9. A method comprising:
   obtaining beam training information by a user equipment (UE) in a wireless communication network, wherein the beam training information comprises a training period, a window size, and resource mapping information;
   generating and transmitting an uplink pilot signal by the UE over one or more UE beams based on the received beam training information, wherein a subset of uplink beam patterns is transmitted; and
   receiving a beam training complete command from a base station (BS), wherein the beam training complete command comprises a selected UE beam ID and a timing advance value associated with the selected UE beam for uplink transmission.

10. The method of claim 9, wherein the UE applies switched beamforming over the one or more UE beams for the uplink pilot signal transmission.

11. The method of claim 9, wherein the beam training involves either an initial beam alignment procedure or a subsequent beam tracking procedure.

12. The method of claim 9, wherein the uplink pilot signal is transmitted as a random access preamble over a random access channel (RACH) during a RACH procedure.

13. The method of claim 12, wherein the RACH procedure is contention-based for initial beam alignment.

14. The method of claim 12, wherein the RACH procedure is non-contention-based for subsequent beam tracking, and wherein the UE receives the random access preamble and a RACH resource via the resource mapping information.

15. The method of claim 14, wherein the UE initiates the beam tracking procedure by sending a beam-tracking request comprising a number of UE beam patterns for tracking.

16. A user equipment (UE), comprising:
   a beam training circuit that retrieves beam training information in a wireless communication network, wherein the beam training information comprises a training period, a window size, and resource mapping information;
   a transmitter that generates and transmits an uplink pilot signal by the UE over one or more UE beams based on the received beam training information, wherein a subset of uplink beam patterns is transmitted; and
   a receiver that receives a beam training complete command from a base station (BS), wherein the beam training complete command comprises a selected UE beam ID and a timing advance value associated with the selected UE beam for uplink transmission.

17. The UE of claim 16, wherein the UE applies switched beamforming over the one or more UE beams for the uplink pilot signal transmission.

18. The UE of claim 16, wherein the beam training involves either an initial beam alignment procedure or a subsequent beam tracking procedure.

19. The UE of claim 16, wherein the uplink pilot signal is transmitted as a random access preamble over a random access channel (RACH) during a RACH procedure.

20. The UE of claim 19, wherein the RACH procedure is contention-based for initial beam alignment.

21. The UE of claim 19, wherein the RACH procedure is non-contention-based for subsequent beam tracking, and wherein the UE receives the random access preamble and a RACH resource via the resource mapping information.

22. The UE of claim 21, wherein the UE initiates the beam tracking procedure by sending a beam-tracking request comprising a number of UE beam patterns for tracking.

23. A method comprising:
   receiving a beam alignment request message by a base station (BS) from a user equipment (UE) in a wireless communication network;
   generating and providing beam training information by the BS to the UE;
   receiving an uplink pilot signal transmitted from the UE via an aligned UE beam, wherein the aligned UE beam is one of a first plurality of UE beams that was transmitted by the UE using switched beamforming in accordance with the beam training information, and wherein a subset of uplink beam patterns is received;
   performing uplink adaptive beamforming in a beam alignment procedure using a second plurality of BS beams, wherein the uplink has less pilot signals than the downlink pilot signals and the adaptive beamforming estimates one or more receiving beam patterns; and
   transmitting a beam training complete command by the BS to the UE, wherein the beam training complete command comprises a beam ID of the aligned UE beam and a timing advance value associated with the aligned UE beam.

* * * * *